US012722631B2

(12) United States Patent
Park

(10) Patent No.: US 12,722,631 B2
(45) Date of Patent: Sep. 1, 2026

(54) VEHICLE AND SERVER FOR PROVIDING INFORMATION

(71) Applicants: HYUNDAI MOTOR COMPANY, Seoul (KR); KIA CORPORATION, Seoul (KR)

(72) Inventor: Jun Yong Park, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 3 days.

(21) Appl. No.: 18/936,392

(22) Filed: Nov. 4, 2024

(65) Prior Publication Data

US 2025/0360921 A1 Nov. 27, 2025

(30) Foreign Application Priority Data

May 21, 2024 (KR) ........................ 10-2024-0065818

(51) Int. Cl.
*B60W 30/12* (2020.01)
*B60W 40/09* (2012.01)
(Continued)

(52) U.S. Cl.
CPC ............ *B60W 30/12* (2013.01); *B60W 40/09* (2013.01); *B60W 50/16* (2013.01);
(Continued)

(58) Field of Classification Search
CPC ...... B60W 30/12; B60W 40/09; B60W 50/16; B60W 2050/143; B60W 2050/146;
(Continued)

(56) References Cited

U.S. PATENT DOCUMENTS

2022/0111834 A1* 4/2022 Yang .................. B60W 30/143
2023/0322208 A1* 10/2023 Rojas ................. B60W 50/085 701/41
2024/0025402 A1 1/2024 Kim

FOREIGN PATENT DOCUMENTS

CN 114312845 A * 4/2022
KR 20130056063 A 5/2013
(Continued)

OTHER PUBLICATIONS

Machine Translation of KR 20220046935 A PDF File Name: "KR20220046935A_Machine_Translation.pdf" (Year: 2022).*
(Continued)

*Primary Examiner* — Grant Moubry
*Assistant Examiner* — Ruben Picon-Feliciano
(74) *Attorney, Agent, or Firm* — Lempia Summerfield Katz LLC

(57) ABSTRACT

A vehicle may collect turning tendency information, including road information and driving information. The vehicle may transmit this information to a server. The server trains steering angle training data by using the turning tendency information and transmits the trained steering angle training data to the vehicle. Then, an amount of steering angle assistance may be output from the vehicle to a driver based on the received trained steering angle training data and the actual steering angle of a driver. This enables to provide information on the amount of steering angle assistance to assist in restricted situations, such as the deactivation of lane following assist (LFA), and to ensure driving safety and dynamic turning assistance by reflecting the individual turning tendencies for each driver on different roads as much as possible.

13 Claims, 6 Drawing Sheets

(51) Int. Cl.
*B60W 50/14* (2020.01)
*B60W 50/16* (2020.01)

(52) U.S. Cl.
CPC . *B60W 2050/143* (2013.01); *B60W 2050/146* (2013.01); *B60W 2520/10* (2013.01); *B60W 2540/18* (2013.01); *B60W 2552/30* (2020.02); *B60W 2556/45* (2020.02)

(58) Field of Classification Search
CPC ......... B60W 2520/10; B60W 2540/18; B60W 2552/30; B60W 2556/45; B60W 40/06; B60W 2050/0075; B60W 30/18145; B60W 2420/403; B62D 15/029; B60Y 2400/92
See application file for complete search history.

(56) References Cited

FOREIGN PATENT DOCUMENTS

| | | | | | |
|---|---|---|---|---|---|
| KR | 101734720 | B1 | | 5/2017 | |
| KR | 20220046935 | A | * | 4/2022 | ............ G06N 3/091 |
| KR | 20230071931 | A | | 5/2023 | |
| KR | 20240012109 | A | | 1/2024 | |

OTHER PUBLICATIONS

Machine Translation of CN 114312845 A PDF File Name: "CN114312845A_Machine_Translation.pdf" (Year: 2022).*

* cited by examiner

VEHICLE AND SERVER FOR PROVIDING INFORMATION

CROSS-REFERENCE TO RELATED APPLICATION

The present application claims the benefit of and priority to Korean Patent Application No. 10-2024-0065818 filed on May 21, 2024, the entire contents of which are incorporated herein for all purposes by this reference.

BACKGROUND OF THE DISCLOSURE

Field of the Disclosure

The present disclosure relates to a vehicle and a server for providing information on an amount of steering angle assistance to assist in situations where driver assistance functions are restricted on roads and improve driving convenience by reflecting different turning tendencies of each driver.

Description of the Related Art

Drivers may face numerous unexpected and dangerous situations while driving due to reasons, such as their own or others' drowsy driving, inexperienced driving, reckless driving, or road conditions.

Accordingly, advanced driver assistance systems (ADAS) have been developed to assist driving safety by allowing vehicles to independently determine some of the dangerous situations that occur while driving.

Lane following assist (LFA) and lane keeping assist (LKA) are examples of ADAS technologies that also apply to autonomous vehicles and help drivers drive more safely.

However, the LFA function is frequently deactivated on curved roads, and there is a limitation where the conditions required to activate the LFA are not met when a curvature exceeds a certain level. In addition, because each driver has different turning tendencies, including vehicle speed, steering angle, and lane violation on curved roads, there is a need for a system that reflects these different tendencies for different drivers.

The information disclosed in this Background of the Disclosure section is only for enhancement of understanding of the general background of the present disclosure. The information in this Background of the Disclosure section may not be taken as an acknowledgement or any form of suggestion that this information forms the related art already known to a person having ordinary skill in the art.

SUMMARY

The present disclosure provides a vehicle to collect turning tendency information including road information and driving information. Then, the collected turning tendency information may be used to train steering angle training data. Both the trained steering angle training data and an actual steering angle of a driver may be used to determine an amount of steering angle assistance. Information on the determined amount of steering angle assistance may be output to the driver. A vehicle and a server for providing information may assist in restricted situations, such as the deactivation of lane following assist (LFA), and may improve driving convenience by reflecting the different turning tendencies of each driver on curved roads as much as possible.

Technical problems of the present disclosure are not limited to the above-mentioned technical problems. Any other unmentioned technical problems may be clearly understood from the following description by those having ordinary skill in the art.

A vehicle according to an embodiment of the present disclosure may include an information collector configured to collect turning tendency information including road information and driving information. The vehicle may further include a controller configured to determine an amount of steering angle assistance based on a difference between an actual steering angle of a driver and steering angle training data trained on a turn section, using turning tendency information collected by the information collector.

The information collector may include at least one of a speed sensor, a steering angle sensor, a front camera, or a navigation device.

The road information may include road curvature, and the driving information may include at least one of vehicle speed, steering angle, activation status of lane following assist (LFA) function, or lane violation status.

The vehicle may further include a communication unit configured to transmit turning tendency information to a server and receive steering angle training data trained on the server.

The controller may determine the amount of steering angle assistance when requirements for providing the amount of steering angle assistance are satisfied and a training of steering angle training data is completed.

The controller may determine that the requirements for providing the amount of steering angle assistance are satisfied when road curvature is higher than a preset value, the LFA is deactivated, or vehicle speed falls within a preset range.

The controller may determine that the training of the steering angle training data is completed when communication between the server and the controller is normal and the number of training iterations for turning tendency information on the server reaches at least a preset number.

The controller may determine the amount of steering angle assistance based on the difference between the actual steering angle of the driver and the trained steering angle training data.

The controller may determine the amount of steering angle assistance by applying a safety margin to the difference, based on the number of lane violations.

The controller may output the amount of steering angle assistance in a direction opposite to an actual steering direction of the driver when the actual steering angle of the driver is greater than the trained steering angle training data. The controller may output the amount of steering angle assistance in a same direction as the actual steering direction of the driver when the actual steering angle of the driver is less than the trained steering angle training data.

The vehicle may further include an output device configured to output information corresponding to the amount of steering angle assistance determined by the controller.

The output device may include at least one of a display device, a speaker, or a vibration device.

A server may include a communication unit configured to receive turning tendency information from a vehicle, including road information and driving information, and to transmit trained steering angle training data to the vehicle. The server may also include a control unit configured to determine validity of the turning tendency information and to train steering angle training data by using valid turning tendency information. The control unit determines the validity of the turning tendency information when vehicle speed falls within a preset range and a lane violation occurs.

The steering angle training data may include initially trained data generated by using valid information determined from collected turning tendency information. The steering angle training data may further include additionally trained data configured to correct the initially trained data through further training of the determined initial training data.

The control unit may substitute valid turning tendency information into a training data table for at least a preset number of times. The control unit may conduct initial training by substituting vehicle speed and road curvature into the training data table, so as to generate the training data table to obtain a corresponding steering angle. The training data table may define the steering angle based on vehicle speed and road curvature.

When lane violations occur for at least a preset number of times after the training data table is generated, the control unit may add weight to valid turning tendency information after initial training. The control unit may additionally substitute the valid turning tendency information into the training data table, so as to conduct additional training to correct the training data table.

By assisting in restricted situations, such as when the LFA is deactivated, an appropriate amount of steering angle assistance for turning may be continuously provided, regardless of the road environment.

Providing different amounts of steering angle assistance for different drivers may add an element of fun to driving by giving drivers the opportunity to learn the vehicle and acquire a turning strategy that suits their preferences.

In addition, the amount of steering angle assistance may be expected to help secure driving safety and support dynamic turning maneuvers.

It should be appreciated by persons having ordinary skill in the art that the effects that can be achieved through the present disclosure are not limited to what has been particularly described hereinabove and other advantages of the present disclosure should be more clearly understood from the following detailed description.

Figure 1:
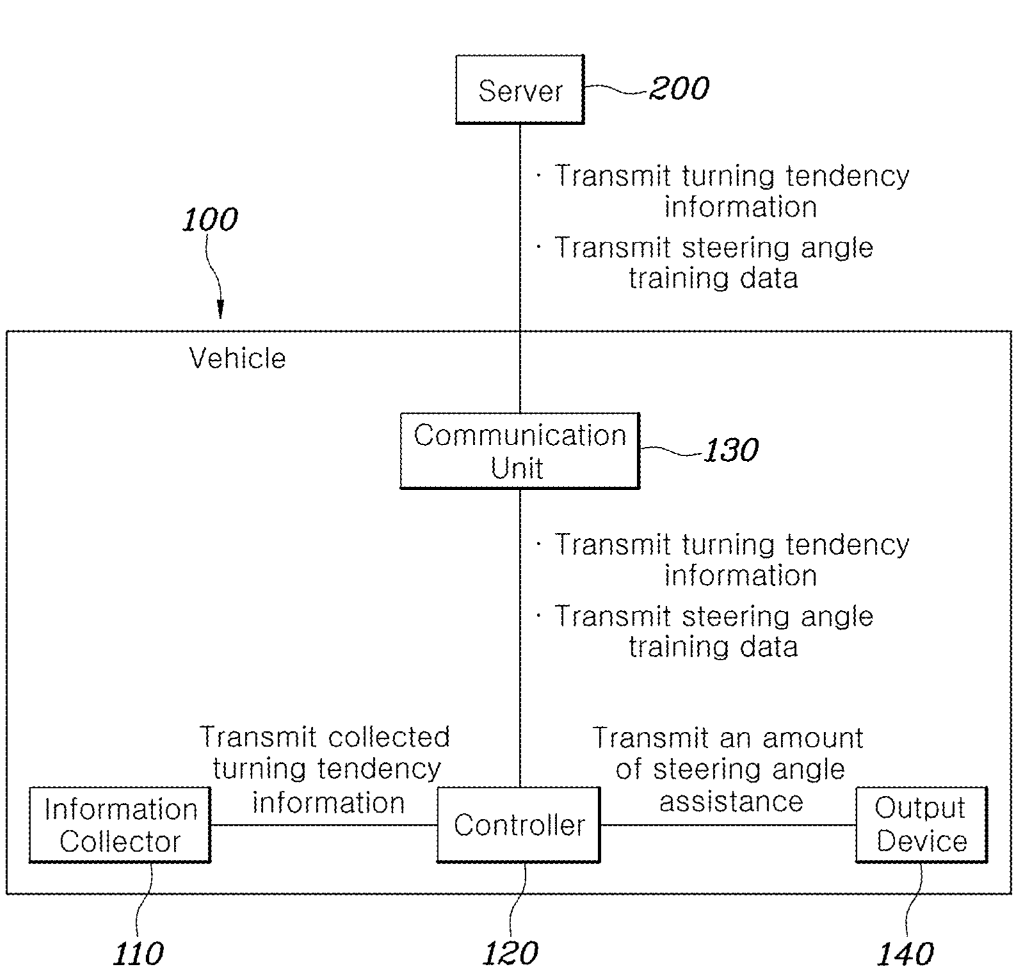
FIG. 1 is a diagram for describing an operation of a vehicle and a server according to an embodiment of the present disclosure.

It may be understood that the appended drawings are not necessarily to scale and present a somewhat simplified representation of various s features illustrating the basic principles of the present disclosure. The specific design features of the present disclosure as disclosed herein, including, for example, specific dimensions, orientations, locations, and shapes, are determined in part by the particularly intended application and use environment.

In the figures, same reference numbers refer to the same or equivalent parts of the present disclosure throughout the several figures of the drawing.

DETAILED DESCRIPTION OF THE DISCLOSURE

In the description of the embodiments disclosed in the present disclosure, the specific descriptions of publicly known related technologies have been omitted when it is determined that the specific descriptions may obscure the subject matter of the embodiments disclosed in the present disclosure. In addition, it should be interpreted that the accompanying drawings are provided only to allow those having ordinary skill in the art to easily understand the embodiments disclosed in the present disclosure. The technical spirit disclosed in the present disclosure is not limited by the accompanying drawings and includes all alterations, equivalents, and alternatives that are included in the spirit and the technical scope of the present disclosure.

The terms including ordinal numbers such as “first,” “second,” and the like may be used to describe various constituent elements, but the constituent elements are not limited by the terms. These terms are used only to distinguish one constituent element from another constituent element.

Singular expressions include plural expressions unless clearly described as different meanings in the context.

In the present disclosure, it should be understood the terms “comprises,” “comprising,” “includes,” “including,” “containing,” “has,” “having” or other variations thereof are inclusive and therefore specify the presence of stated features, integers, steps, operations, elements, components, or combinations thereof. However, the terms do not preclude the presence or addition of one or more other features, integers, steps, operations, elements, components, or combinations thereof.

Embodiments of the disclosure are described hereinafter in detail with reference to the attached drawings. The same or similar elements are designated with the same numeral references regardless of the numerals in the drawings, and their redundant descriptions have been omitted. When a controller, module, component, device, element, or the like of the present disclosure is described as having a purpose or performing an operation, function, or the like, the controller, module, component, device, element, or the like should be considered herein as being “configured to” meet that purpose or to perform that operation or function. Each controller, module, component, device, element, and the like may separately embody or be included with a processor and a memory, such as a non-transitory computer readable media, as part of the apparatus.

First, in an embodiment of the present disclosure, a vehicle may be configured to collect turning tendency information including road information and driving information. Then, the collected turning tendency information may be used to train steering angle training data. Both the trained steering angle training data and a driver’s actual steering angle may be used to determine an amount of steering angle assistance. Information on the determined amount of steering angle assistance may be output to the driver to assist the driver in turning. This may provide information on the amount of steering angle assistance to assist in restricted situations, such as the deactivation of lane following assist (LFA), and to ensure driving safety and dynamic turning assistance by reflecting the individual turning tendencies for each driver on different roads as much as possible.

FIG. 1 is a diagram for describing an operation of a vehicle and a server according to an embodiment of the present disclosure.

Referring to this diagram, the vehicle, the server, and their operation according to the embodiment of the present disclosure are described.

Referring to FIG. 1, the embodiment of the present disclosure may be implemented by a vehicle 100 and a server 200. The vehicle 100 may include an information collector 110, a controller 120, a communication unit 130, and an output device 140. FIG. 1 primarily describes components related to the embodiment of the present disclosure, and actual vehicles may include more or fewer components.

Each component is described below.

The information collector 110 may be equipped outside or inside the vehicle.

For example, the information collector 110 may be a device capable of collecting turning tendency information, such as a speed sensor, a steering angle sensor, a front camera, or a navigation device. However, this is an example and is not necessarily limited thereto.

In this case, turning tendency information may include road information and driving information. The road information may include road curvature, and the driving information may include at least one of vehicle speed, steering angle, activation status of lane following assist (LFA) function, or lane violation status.

More specifically, the information collector 110 may collect the vehicle speed based on the driving information collected by a speed sensor. The information collector 110 may collect a driver's actual steering angle based on the driving information collected by a steering angle sensor. The information collector 110 may collect road curvature based on the road information collected by a front camera and a navigation device.

The information collector 110 may transmit turning tendency information, collected above, to the controller 120.

The controller 120 may control the transmission of turning tendency information collected by the information collector 110 to the server 200 through the communication unit 130. The controller 120 may determine an amount of steering angle assistance based on both steering angle training data received from the server 200 and the driver's actual steering angle collected by the information collector 110. The controller 120 may control the output of the amount of steering angle assistance to the driver through the output device 140.

Additionally, the controller 120 may individually utilize turning tendency information collected by each information collector 110 and steering angle training data received from the server 200. Alternatively, the controller 120 may combine both to determine the amount of steering angle assistance.

In an implementation of the controller 120 according to the embodiment of the present disclosure, the controller 120 may be implemented as a function of an audio/video/navigation (AVN) system equipped in a vehicle. However, this is an example and is not necessarily limited thereto. For example, the controller 120 may be implemented as a separate controller from an AVN controller, or the function may be distributed across two or more different controllers.

Additionally, the communication unit 130 may transmit turning tendency information to the server 200 and may receive the trained steering angle training data from the server 200 and transmit this data to the controller 120 of the vehicle.

The output device 140 may output the amount of steering angle assistance received from the controller 120. In this case, the output device 140 may include at least one of a display device, a speaker, or a vibration device.

The server 200 may receive turning tendency information through a communication unit. The server 200, through a control unit, may train steering angle training data based on the received turning tendency information. The trained steering angle training data may be transmitted to the vehicle 100 through the communication unit.

In an embodiment of the present disclosure, an operation process of a vehicle and a server is described in detail hereinafter.

When a vehicle 100 is turning on a curved road, turning tendency information, including road information and driving information, may be collected by an information collector 110 provided in the vehicle 100, as described above.

In regard of turning tendency information, the road information may include road curvature, and the driving information may include vehicle speed, steering angle, activation status of the LFA function, and lane violation status. However, this is an example and is not necessarily limited thereto.

A controller 120 of the vehicle may determine whether requirements for providing an amount of steering angle assistance are satisfied. These requirements for providing the amount of steering angle assistance may include at least one of the following: whether road curvature is higher than a preset value, whether the LFA is deactivated, or whether vehicle speed falls within a preset range. Specifically, the controller 120 of the vehicle may provide the amount of steering angle assistance when road curvature is higher than a preset value and the LFA is deactivated. Additionally, when vehicle speed falls within a preset range, the controller 120 may determine that the requirements for providing the amount of steering angle assistance are satisfied.

Additionally, the controller 120 of the vehicle may determine whether a training of steering angle training data is completed. In this case, the controller 120 may determine that the training of steering angle training data is completed when communication with a server 200 is normal and the number of training iterations for steering angle training data on the server 200 reaches at least a preset number.

In this case, the number of training iterations may refer to the number of times valid turning tendency information, which is described below, is used to train steering angle training data. Alternatively, the number of training iterations may refer to the number of times turning tendency information is transmitted from the vehicle 100 to the server 200. The number of training iterations may be included in steering angle training data transmitted from the server 200 to the vehicle 100, or the server 200 may separately transmit the iterations, or the vehicle 100 may also directly count the iterations.

The vehicle 100 may transmit turning tendency information, collected by the information collector 110, to the server 200 through a communication unit 130, and may receive steering angle training data from the server 200.

The server 200 may determine the validity of turning tendency information based on the information received from the vehicle 100. The server 200 may train steering angle training data by using valid turning tendency information. The server 200 may transmit the trained steering angle training data to the vehicle 100.

In this case, the server 200 may determine the validity of turning tendency information when vehicle speed falls within a preset range and a lane violation occurs.

For example, in the case where the preset speed range is 60 km/h to 70 km/h, the server 200 may determine turning tendency information as valid when the vehicle 100 is traveling at a speed of 65 km/s and invades a lane while turning.

The server 200 may train steering angle training data by using the valid turning tendency information.

In this case, the steering angle training data may include initially trained data generated by using valid turning tendency information determined from collected turning tendency information. The steering angle training data may include additionally trained data configured to correct the initially trained data through further training of the determined initial training data.

The server 200 may manage steering angle training data in the form of a function or table, where the steering angle is defined as a variable using vehicle speed and road curvature.

When the server 200 manages the steering angle training data in the form of a table, the server 200 may substitute valid turning tendency information into a training data table for at least a preset number of time and may conduct initial training by substituting vehicle speed and road curvature into the table. Thus, the training data table may be generated to obtain (0 corresponding steering angle.

When a driver invades a lane for at least a preset number of times after initial training, the server 200 may add weight to valid turning tendency information after initial training, and the server 200 may additionally substitute the valid turning tendency information into the training data table previously generated through the initial training. Thus, additional training is conducted to correct the training data table.

A specific example of the table and the process for the initial and additional training, as described above, on the server 200 is described in more detail below with reference to FIG. 4.

After the training of steering angle training data, the server 200 may also determine a driver's turning tendency based on the number of lane violations included in valid turning tendency information. For example, after initial training, the server 200 may determine that a driver is aggressive when the number of lane violations reaches at least a preset number, or passive when the opposite is true. Additionally, the server 200 may differentiate a driver's turning tendencies into specific stages or levels for determination.

Then, the server 200 may transmit trained steering angle training data to the vehicle 100.

The controller 120 of the vehicle, which receives the trained steering angle training data, may determine an amount of steering angle assistance based on the difference between the received trained steering angle training data and the driver's actual steering angle.

Specifically, the controller 120 may divide the difference between the driver's actual steering angle included in turning tendency information and the trained steering angle training data by the maximum steering angle of the vehicle. The controller 120 may convert the resulting value into a percentage. The controller 120 may determine this value as the amount of steering angle assistance.

Additionally, the controller 120 may make corrections to the amount of steering angle assistance by adding or subtracting a safety margin. In this case, the correction may be made in a way that reduces the absolute value of the amount of steering angle assistance.

In this case, the controller 120 may control an output device 140 such that the amount of steering angle assistance is output in a direction opposite to the driver's actual steering direction when the actual steering angle is greater than the trained steering angle training data. The amount of steering angle assistance is output in the same direction as the driver's actual steering direction when the actual steering angle is less than the trained steering angle training data.

The controller 120 may control the determined amount of steering angle assistance to be output through the output device 140 of the vehicle.

For example, the controller 120 may control at least one of a display device, a speaker, or a vibration device included in the output device 140 to output an amount of steering angle assistance.

Specifically, the amount of steering angle assistance may be output as a visual element such as an arrow image on the display device. The amount of steering angle assistance may be output as a voice signal through the speaker. The amount of steering angle assistance may be output through the vibration device by increasing the intensity of the vibration as the magnitude of the steering angle assistance increases. The specific form in which the amount of steering angle assistance is output using the display device is described below with reference to FIG. 5 and FIG. 6.

Figure 2:
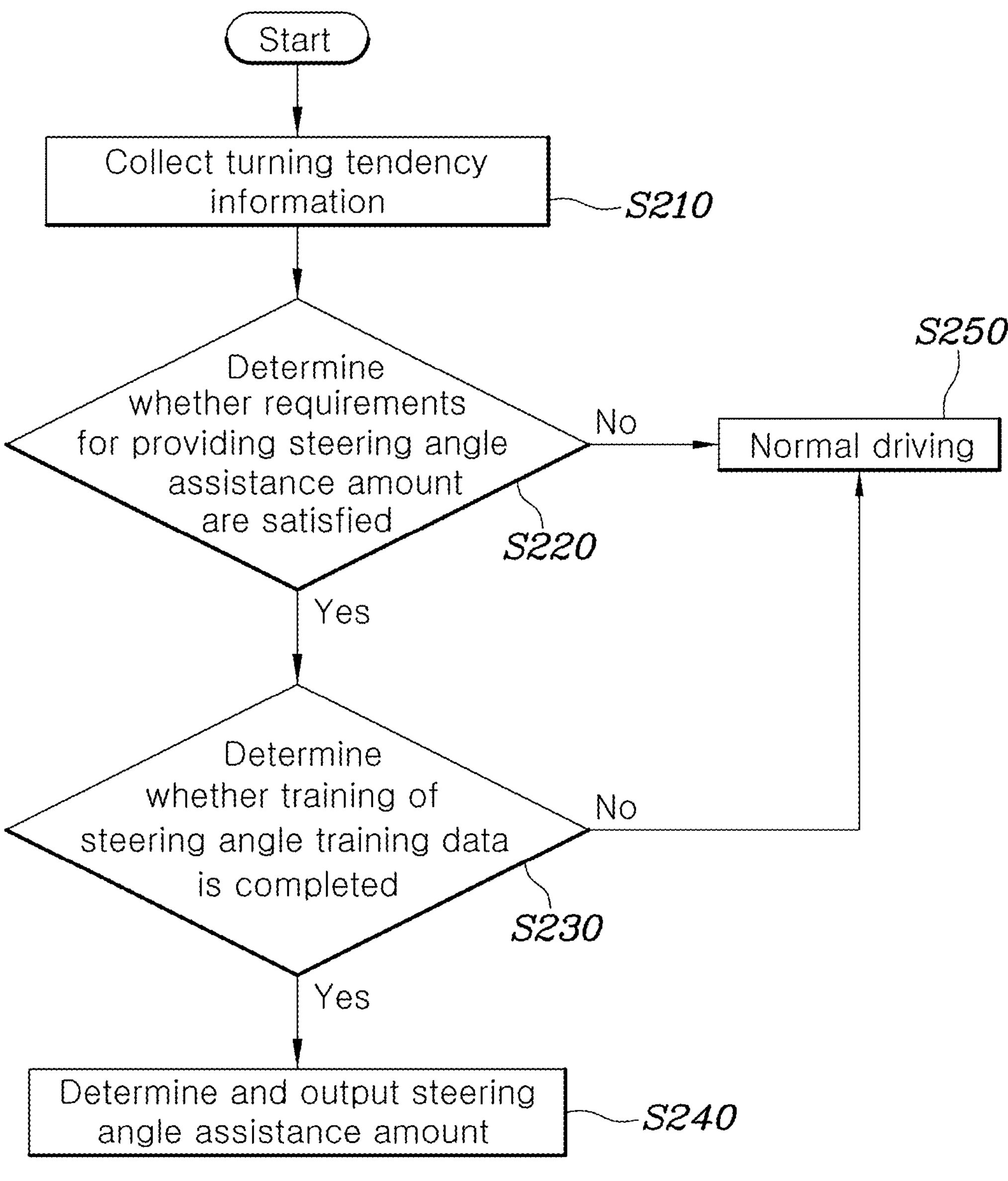
FIG. 2 is a flowchart showing an operation of a vehicle according to an embodiment of the present disclosure.
Figure 3:
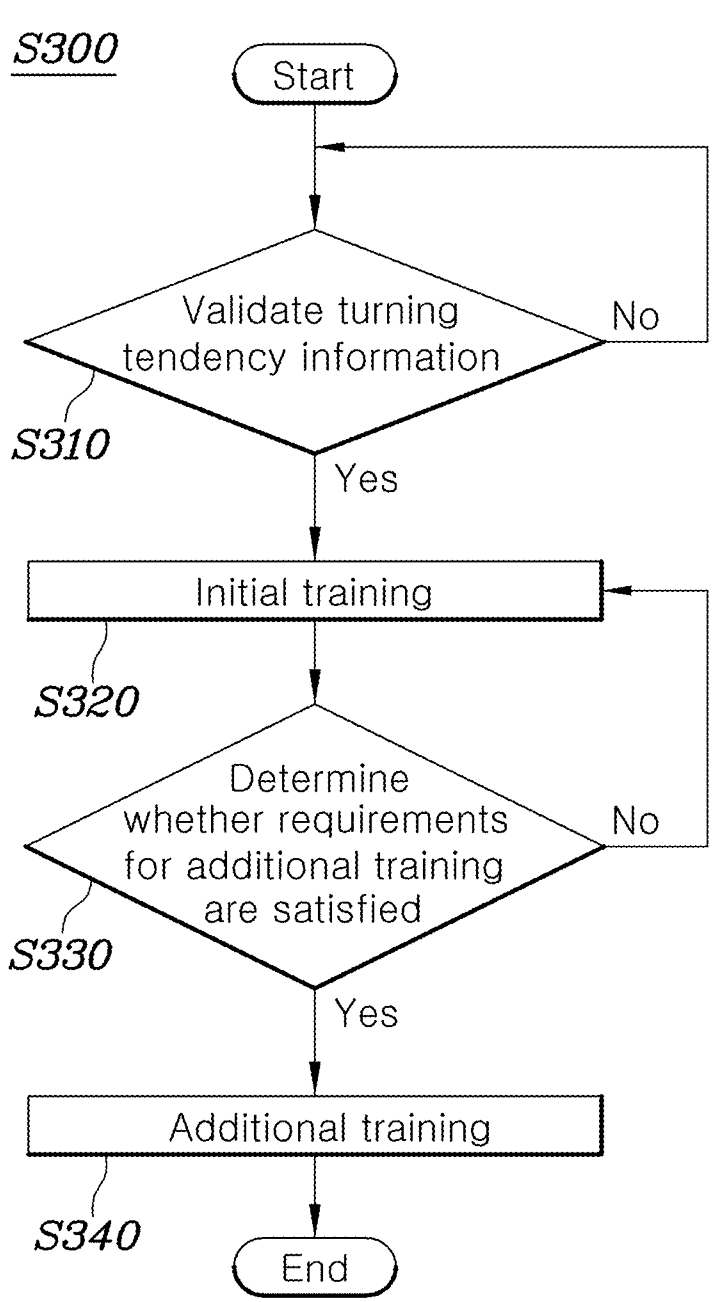
FIG. 3 is a flowchart showing an operation of a server according to an embodiment of the present disclosure.

The process of providing the amount of steering angle assistance in the embodiment described so far is shown in a flowchart, provided in FIG. 2 and FIG. 3.

FIG. 2 is a flowchart showing an operation of a vehicle according to an embodiment of the present disclosure.

Referring to FIG. 2, a vehicle 100 may collect turning tendency information (S210).

In this case, the vehicle 100 may collect turning tendency information through an information collector 110, and as described above, turning tendency information may include road information and driving information. The road information may include road curvature, and the driving information may include at least one of vehicle speed, steering angle, activation status of the LFA function, and lane violation status.

The vehicle 100 may transmit such turning tendency information to a server 200.

The vehicle 100 may determine whether requirements for providing an amount of steering angle assistance are satisfied (S220).

In this case, a controller 120, as described above, may determine that the requirements for providing the amount of steering angle assistance are satisfied when road curvature is higher than a preset value, the LFA is deactivated, or vehicle speed falls within a preset range.

When the requirements for providing the amount of steering angle assistance are not satisfied (No in S220), the vehicle 100 may perform normal driving (S250) without providing an amount of steering angle assistance.

When the requirements for providing the amount of steering angle assistance are satisfied (Yes in S220), the vehicle 100 may determine whether a training of steering angle training data is completed (S230).

In this case, the controller 120, as described above, may determine that the training of steering angle training data is completed when communication with the server 200 is normal and the number of training iterations for the steering angle training data on the server 200 reaches at least a preset number.

When it is determined that the training of steering angle training data is not completed (No in S230), the vehicle 100 may transmit turning tendency information to the server 200 and perform normal driving (S250) without providing an amount of steering angle assistance.

When it is determined that the training of steering angle training data is not completed (Yes in S230), the vehicle 100 may determine and output an amount of steering angle assistance (S240).

As described above, the controller 120 of the vehicle, which receives steering angle training data, may determine the amount of steering angle assistance based on the difference between the received trained steering angle training data and the driver's actual steering angle.

The controller 120 may control the determined amount of steering angle assistance to be output through an output device 140 of the vehicle 100. For example, the controller 120 may control at least one of a display device, a speaker, or a vibration device included in the output device 140 to output an amount of steering angle assistance.

FIG. 3 is a flowchart showing an operation (S300) of a server according to an embodiment of the present disclosure.

A server 200 may determine whether turning tendency information is valid (S310).

As described above, when a vehicle invades a lane or when vehicle speed falls within a preset range, the server 200 may determine that the turning tendency information is valid and use this information to train the steering angle training data.

On the other hand, when a vehicle does not invade a lane or when vehicle speed does not fall within the preset range, the server 200 may determine that the turning tendency information is invalid. The server 200 may not use the invalid turning tendency information to train the steering angle training data.

The specific example may also be as described above.

When the turning tendency information is valid (Yes in S310), the server 200 may conduct initial training using turning tendency information determined as valid (S320).

The server 200 may determine whether initial training is completed. When initial training is not completed, the server 200 may conduct initial training by substituting valid steering tendency information into steering angle training data for at least a preset number of times to generate initially trained steering angle training data. This initially trained steering angle training data may be transmitted to a vehicle 100.

The server 200 may determine whether requirements for additional training are satisfied after initial training (S330).

When the vehicle 100 invades a lane for at least a preset number of times after initial training, the server 200 may determine that the requirements for additional training are satisfied.

When the requirements for additional training are satisfied (Yes in S330), the server 200 may conduct additional training (S340).

When a driver invades a lane for at least a preset number of times after initial training, the server 200 may add weight to valid turning tendency information after initial training, and the server 200 may additionally substitute the valid turning tendency information into the steering angle training data previously generated through the initial training. Thus, additional training is conducted to correct the steering angle training data. This additionally trained steering angle training data may be transmitted to the vehicle 100.

In this case, as described above, the steering angle training data may include initially trained data generated by using valid information determined from collected turning tendency information. The steering angle training data may include additionally trained data configured to correct the initially trained data through further training of the determined initial training data.

Additionally, the steering angle training data may be in the form of a training data table. In the table, the steering angle training data is defined based on vehicle speed and road curvature.

After a training data table 400 is generated by initial training, the server 200 may determine the driver's turning tendency based on the number of lane violations included in valid turning tendency information.

The specific form of the training data table and the training of steering angle training data are described hereinafter with reference to FIG. 4.

Figure 4:
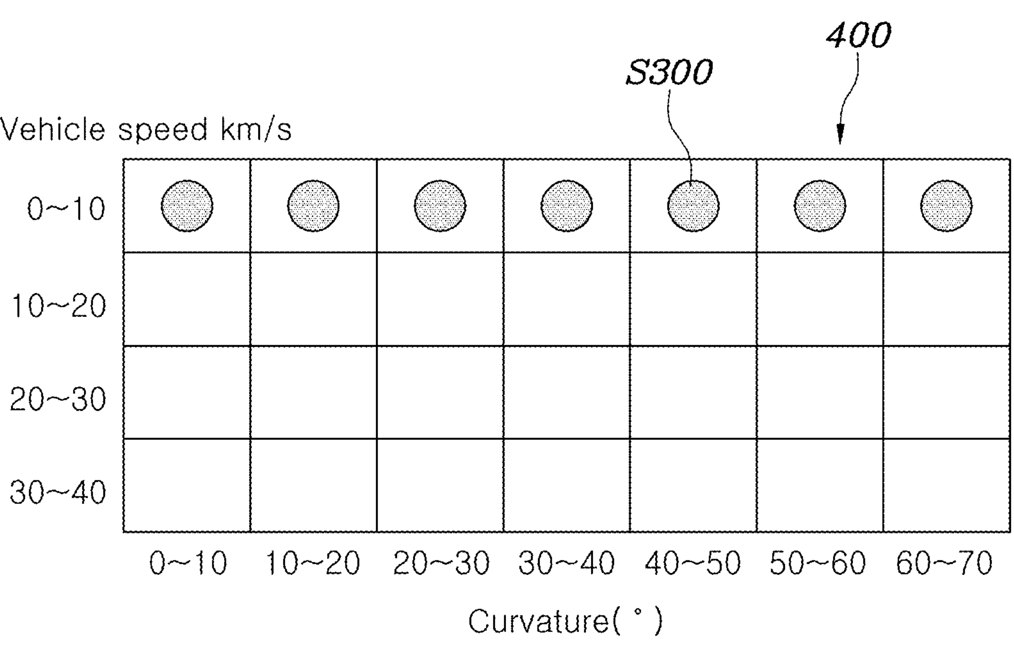
FIG. 4 is a diagram for describing how a server trains steering angle training data according to an embodiment of the present disclosure.

FIG. 4 is a diagram for describing how a server is trained on steering angle training data according to an embodiment of the present disclosure.

Referring to FIG. 4, the steering angle training data may be in the form of a training data table 400, and the training data table 400 may define the steering angle based on vehicle speed and road curvature. For example, the training data table 400 may be a table of indexes. In the table of indexes, rows of the table correspond to road curvature, and columns correspond to vehicle speed. Alternatively, the training data table 400 may be modified so that the rows of the table correspond to vehicle speed, and the columns correspond to road curvature. Each index may correspond to a specific range of speeds and a specific range of road curvature.

These steering angle training data and the form of the training data table are exemplary and are not limited thereto, but for ease of description, the training data table 400 is assumed to be in the form shown in FIG. 4 below.

As described above, a server 200 may determine vehicle speed and road curvature, which are included in valid turning tendency information. The server 200 may then substitute the turning tendency information to an index corresponding to vehicle speed and road curvature, and such substitution may be performed for at least a preset number of times for each index. In this case, the turning tendency information substituted to the index may include the driver's actual steering angle. After the above substitutions are performed for at least the preset number of times for each index, the server 200 may calculate the average value of the turning tendency information for each index. In doing so, the server 200 may conduct initial training to generate the training data table 400 that allows the server 200 to average the steering angle of the corresponding index by substituting vehicle speed and road curvature into the training data table 400.

When a driver invades a lane for at least a preset number of times after initial training, the server 200 may add weight to valid turning tendency information after initial training, and the server 200 may substitute the information into the index corresponding to vehicle speed and road curvature. The server 200 may then calculate a new average value of the turning tendency information by including the newly substituted turning tendency information. In doing so, the server 200 may conduct additional training to correct the training data table 400 previously generated through initial training.

This series of processes may be represented by the operation (S300) of the server described above with reference to FIG. 3. Through these processes, initial training and additional training may be conducted by substituting and averaging the turning tendency information for each index of the table.

In the embodiment described so far, the vehicle 100 transmits collected turning tendency information to the server 200 through the communication unit 130. The training of steering angle training data is conducted on the server 200, and the trained steering angle training data is transmitted to the vehicle 100. The vehicle 100 then determines an amount of steering angle assistance based on the trained steering angle training data and the driver's actual steering angle.

However, in another embodiment, the functions of a server 200 may be implemented in a vehicle 100, and the functions of the vehicle 100 may also be implemented on the server 200.

For example, some or all of the various components on the server 200 may be implemented as a function of the vehicle's controller 120 mentioned above or implemented through a separate controller or component dedicated to training steering angle training data. In doing so, both the training of the steering angle training data and the determination of the amount of steering angle assistance may be performed in the vehicle.

Additionally, some or all of the various components in the vehicle 100 may be implemented as a function of the control unit of the server 200 described above or implemented through a separate control unit or component that determines an amount of steering angle assistance. In doing so, both the training of the steering angle training data and the determination of the amount of steering angle assistance may be performed on the server 200, and the determined amount of steering angle assistance may be transmitted to the vehicle 100.

Furthermore, these descriptions are exemplary, and the components of the vehicle and the components of the server described above are not necessarily implemented only in the vehicle or the server. The training of steering angle training data and the determination of the amount of steering angle assistance are also not necessarily performed only in the vehicle or the server.

The specific form in which an amount of steering angle assistance is output to a display is described below, with reference to FIG. 5 and FIG. 6.

Figure 5:
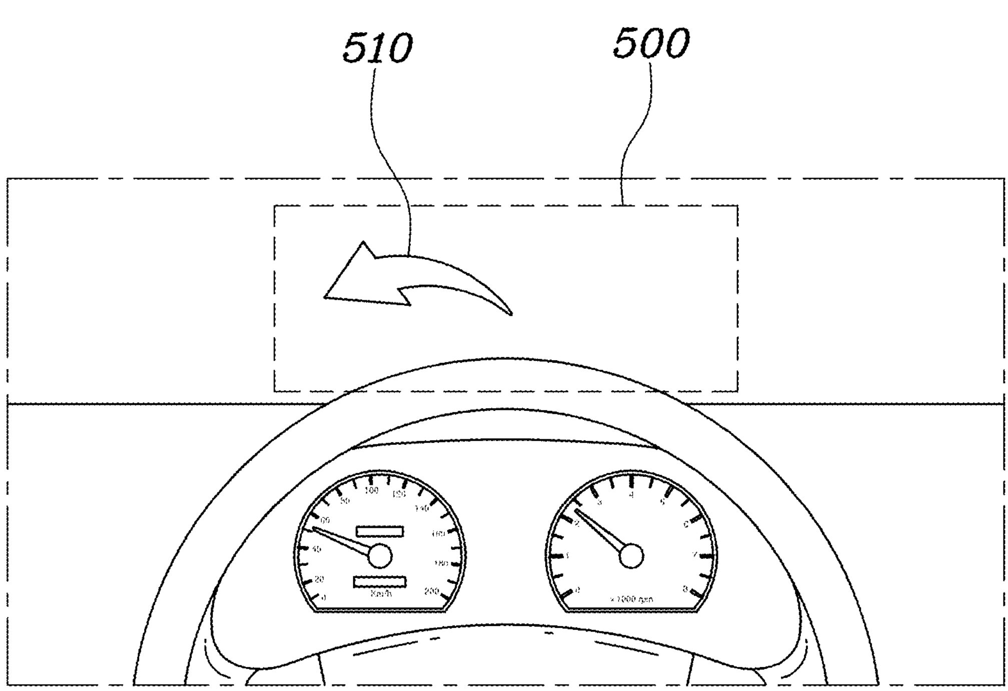
FIG. 5 and FIG. 6 are drawings illustrating examples of an amount of steering angle assistance displayed on an output device according to an embodiment of the present disclosure.
Figure 6:
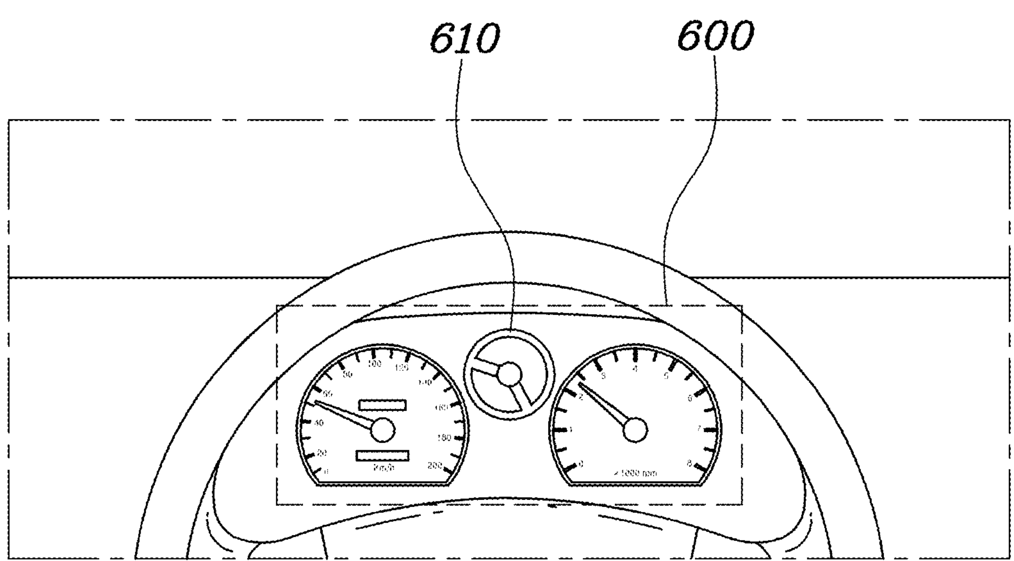

FIG. 5 and FIG. 6 are drawings illustrating examples of an amount of steering angle assistance displayed on an output device according to an embodiment of the present disclosure.

Referring to FIG. 5, a situation in which an amount of steering angle assistance is output to a head up display (HUD) 500 is shown.

A controller 120 may control the HUD 500 such that the amount of steering angle assistance is output to the HUD 500.

The display may be in the form of an arrow image 510 displayed on the HUD 500, as shown in FIG. 5.

In this case, the arrow image 510 may be output in a direction opposite to the driver's actual steering direction when the actual steering angle is greater than the trained steering angle training data. The arrow image 510 may output in the same direction as the driver's actual steering direction when the actual steering angle is less than the trained steering angle training data.

In addition, the arrow image 510 may increase in width or length as the absolute value of the difference between the driver's actual steering angle and the trained steering angle training data is larger. The arrow image 510 may decrease in width or length as the absolute value of the difference between the driver's actual steering angle and the trained steering angle training data is smaller.

Referring to FIG. 6, a situation in which an amount of steering angle assistance is displayed on a cluster 600.

The controller 120 may control the cluster 600 such that the amount of steering angle assistance is displayed on the cluster 600.

The display may show a steering wheel image 610 output to the cluster 600, as illustrated in FIG. 6. The steering wheel image 610 is steered by the steering angle included in the trained steering angle training data or by the steering angle of the steering angle assistance amount.

Through the above methods, an amount of steering angle assistance including the steering angle required for turning may be output to the driver.

In an aspect, the above-described embodiments of the present disclosure may be implemented as a computer-readable code on a program-recorded medium. The computer-readable media include any type of recording device capable of storing data that may be read by a computer system. Examples of computer-readable media include hard disk drives (HDDs), solid state disks (SSDs), silicon disk drives (SDDs), ROMS, RAM, CD-ROMs, magnetic tapes, floppy disks, optical data storage devices, and others.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teachings. The embodiments were chosen and described in order to explain certain principles of the present disclosure and their practical application, to enable those having ordinary skill in the art to make and utilize various embodiments of the present disclosure, as well as various alternatives and modifications thereof. It is intended that the scope of the present disclosure be defined by the Claims appended hereto and their equivalents.

What is claimed is:

1. A vehicle comprising:
- an information collector configured to collect turning tendency information including road information and driving information; and
- a controller configured to determine an amount of steering angle assistance based on a difference between an actual steering angle of a driver and steering angle training data trained on a turn section, using turning tendency information collected by the information collector,
- wherein the controller is further configured to determine the amount of steering angle assistance based on the difference between the actual steering angle of the driver and trained steering angle training data, and
- wherein the controller is further configured to determine the amount of steering angle assistance by applying a safety margin to the difference, based on a number of lane violations.

2. The vehicle of claim 1, wherein the information collector includes at least one of a speed sensor, a steering angle sensor, a front camera, or a navigation device.

3. The vehicle of claim 1, wherein the road information includes road curvature, and the driving information includes at least one of vehicle speed, steering angle, activation status of lane following assist (LFA) function, or lane violation status.

4. The vehicle of claim 1, further comprising:
- a communication unit configured to transmit turning tendency information to a server and receive steering angle training data trained on the server.

5. The vehicle of claim 4, wherein the controller is further configured to determine the amount of steering angle assistance when requirements for providing the amount of steering angle assistance are satisfied and training of steering angle training data is completed.

6. The vehicle of claim 5, wherein the controller is further configured to determine that the requirements for providing the amount of steering angle assistance are satisfied when road curvature is higher than a preset value, the LFA is deactivated, or vehicle speed falls within a preset range.

7. The vehicle of claim 5, wherein the controller is further configured to determine that the training of the steering angle training data is completed when communication between server and the controller is normal and training iterations for turning tendency information on the server reaches at least a preset number.

8. The vehicle of claim 1, wherein the controller is further configured to:

output the amount of steering angle assistance in a direction opposite to an actual steering direction of the driver when the actual steering angle of the driver is greater than trained steering angle training data; and output the amount of steering angle assistance in a same direction as the actual steering direction of the driver when the actual steering angle of the driver is less than trained steering angle training data.

9. The vehicle of claim 1, further comprising:

an output device configured to output information corresponding to the amount of steering angle assistance determined by the controller.

10. The vehicle of claim 9, wherein the output device includes at least one of a display device, a speaker, or a vibration device.

11. A server comprising:

a communication unit configured to receive turning tendency information from a vehicle, including road information and driving information, and to transmit trained steering angle training data to the vehicle; and a control unit configured to determine validity of the turning tendency information and to train steering angle training data by using valid turning tendency information, wherein the control unit is further configured to determine the validity of the turning tendency information when vehicle speed falls within a preset range and a lane violation occurs, wherein the steering angle training data is in a form of a training data table, wherein the training data table defines a steering angle based on vehicle speed and road curvature, wherein the control unit is further configured to substitute valid turning tendency information into the training data table for at least a preset number of times and conduct initial training by substituting vehicle speed and road curvature into the training data table, so as to generate the training data table to obtain a corresponding steering angle, and wherein when lane violations occur for at least a preset number of times after the training data table is generated, the control unit is configured to:

add weight to valid turning tendency information after the initial training; and additionally substitute the valid turning tendency information into the training data table generated through the initial training, so as to conduct additional training to correct the training data table.

12. The server of claim 11, wherein the steering angle training data comprises:

initially trained data generated by using valid information determined from collected turning tendency information; and additionally trained data configured to correct the initially trained data through further training of determined initial training data.

13. The server of claim 11, wherein after training of the steering angle training data, the control unit is configured to determine a turning tendency of a driver based on the number of lane violations included in valid turning tendency information.

* * * * *